US011792647B2

(12) United States Patent
Miao

(10) Patent No.: US 11,792,647 B2
(45) Date of Patent: Oct. 17, 2023

(54) METHOD AND SYSTEM FOR AUTOMATIC AUTHENTICATION AND MANAGEMENT OF OWNERSHIP

(71) Applicant: Guowang Miao, Conroe, TX (US)

(72) Inventor: Guowang Miao, Conroe, TX (US)

( * ) Notice: Subject to any disclaimer, the term of this patent is extended or adjusted under 35 U.S.C. 154(b) by 0 days.

(21) Appl. No.: 17/924,393

(22) PCT Filed: May 12, 2021

(86) PCT No.: PCT/US2021/032082
§ 371 (c)(1),
(2) Date: Nov. 10, 2022

(87) PCT Pub. No.: WO2021/231643
PCT Pub. Date: Nov. 18, 2021

(65) Prior Publication Data
US 2023/0135973 A1 May 4, 2023

Related U.S. Application Data

(60) Provisional application No. 63/023,876, filed on May 13, 2020.

(51) Int. Cl.
*H04W 12/06* (2021.01)
*H04L 9/32* (2006.01)

(52) U.S. Cl.
CPC ........... *H04W 12/06* (2013.01); *H04L 9/3226* (2013.01); *H04L 2209/80* (2013.01)

(58) Field of Classification Search
CPC ... H04W 12/06; H04L 9/3226; H04L 2209/80
See application file for complete search history.

(56) References Cited

U.S. PATENT DOCUMENTS 8,353,018 B2   1/2013  McMillan et al.
10,567,962 B1 * 2/2020  Lu ........................ H04W 12/08
(Continued)

OTHER PUBLICATIONS

The International Search Report and the Written Opinion of the International Searching Authority, or Declaration for International Application No. PCT/US2021/032082, dated Aug. 18, 2021 8 pages.

(Continued)

*Primary Examiner* — Henry Tsang
(74) *Attorney, Agent, or Firm* — Brett A. Schenck

(57) ABSTRACT

A method and system for verifying that a user is the owner of a digital listing that is associated with a WiFi Access Point. The user claims ownership of the WiFi Access Point that is associated with a digital listing of an entity/item/place/business so that he online service provider can verify and register the user as owner of the WiFi Access Point. Once verified, the user owns the WiFi Access Point and its related digital listing and configures the listing. The system includes an item information system receiving the WiFi Access Point data and associated item data, and storing the WiFi Access Point data and the item data, an owner registration and transfer system receiving owner registration data and ownership change requests and storing the ownership history, and an authentication system receiving authentication requests and generating a response based upon the information stored in the system or a connected system.

29 Claims, 16 Drawing Sheets

(56) References Cited

U.S. PATENT DOCUMENTS

| | | |
|---|---|---|
| 2008/0168175 A1* | 7/2008 | Tran .................. G06Q 10/10 |
| | | 709/229 |
| 2008/0177860 A1 | 7/2008 | Khedouri et al. |
| 2010/0122330 A1* | 5/2010 | McMillan ............ H04L 63/12 |
| | | 726/6 |
| 2012/0232974 A1* | 9/2012 | Castiglione ........ G06Q 30/0215 |
| | | 705/14.21 |
| 2015/0134552 A1 | 5/2015 | Engels et al. |
| 2015/0244721 A1 | 8/2015 | Spencer et al. |
| 2015/0381427 A1 | 12/2015 | Roskind et al. |
| 2016/0205087 A1 | 7/2016 | An |
| 2018/0176781 A1* | 6/2018 | Fang .................. H04W 12/06 |

OTHER PUBLICATIONS

Merlin et al., "Design & Implementation of a WIFI based smart home system using LPC1769", International Journal Engineering Research and General Science, Dec. 2015, retrieved on Nov. 9, 2022. Retrieved from the internet <URL: http://pnrsolution.org/Datacenter/Vol3/Issue6/85.pdf> entire document.

* cited by examiner

12011951

METHOD AND SYSTEM FOR AUTOMATIC AUTHENTICATION AND MANAGEMENT OF OWNERSHIP

CROSS-REFERENCE TO RELATED APPLICATIONS

This application is a national stage of International Patent Application No. PCT/US2021/032082, titled "METHOD AND SYSTEM FOR AUTOMATIC AUTHENTICATION AND MANAGEMENT OF OWNERSHIP", filed May 12, 2021, which designated the U.S. and claims benefit under 35 U.S.C. § 119(e) of Provisional Application No. 63/023,876 filed May 13, 2020, the disclosure of which is incorporated by reference in its entirety.

FIELD

The present invention relates to a method and system for automatic authentication and management of ownership. Specifically, the present invention relates to verifying a user as the owner of a WiFi Access Point, said WiFi Access Point may be associated with a public entity/item/place/business. The invention has application at least to the information and communication technology industry.

BACKGROUND

A local business provides a directory to an online service provider. The online service provider stores business information such as contact, pictures, description, reviews, and list of items of local business, in an electronic form, such as a searchable database. The electronic form of the business information is made available as online listing content, aka digital listing, to a user or users.

A business will try to gain exposure to customers by ensuring that the business's listing is in online directories. The online service providers such as SiteNear, Yahoo, Yelp, make listings available online through Web and mobile app interfaces, allowing users to perform advanced searches for individuals and businesses. The online service providers receive the listings from crowd sourcing. Through the online service providers, members of the general public gain high-speed access to all of the listings stored on the servers. The online service providers can also use external data sources that store the listings.

To modify a listing on a listing Web site, a representative of the business normally navigates to the Web site, finds his or her business listing, and clicks on a button that allows one to modify the business listing after the representative has been verified to be the owner of the business. To ensure that listings are accurate, the online service providers sometimes require the representative to agree to terms of an online agreement. The terms indicate that the representative declares to have the authority to make decisions on behalf of the company. Some online service providers may merely require the representative to pay, without a statement that he or she has authority to modify the listing.

A problem arises when a visitor to the Web site or mobile app claims to have authority to make changes to the listing, but he or she does not actually have such authority. The problem is compounded by the fact that the online service providers routinely allow changes to be made to standard listings even without charging a fee. Also, modifications are effective immediately without editorial review. A visitor claiming to have authority to make changes to a listing would be allowed to modify the listing in ways that may harm the company's reputation or divert customers, and such unauthorized changes can make the online service provider's listings unreliable. Consumers can be easily misled or frustrated by incorrect information. Therefore, the online service providers need to use a way to ensure the validity of modifications to the listings.

U.S. Pat. No. 8,353,018B2 teaches an owner verification method. In this method, the online service provider uses information regarding the user and the digital listing to generate a verification code. The online service provider delivers the verification code to the owner of the digital listing via the contact information provided by the digital listing. If the user owns the digital listing, then the user receives the verification code via contact information associated with the digital listing. The user can then verify ownership by sending the verification code to the online service provider via the Web site. The user can then modify the listing. With the verification code method, after the user verifies the code to the online service provider, the user can change the contact information. Because the verification code method requires the code to be stored, the method is susceptible to security breaches where records containing codes find their way to the public. If the user does not have access to the contact address or code, then the user can attempt to guess the verification code if the code length is small. If the user is successful at guessing the code, then the user is verified.

Thus, a heretofore unaddressed need exists in the industry to address the aforementioned deficiencies and inadequacies for effective authentication of listing owner and to ensure the validity of modifications and management to the online listings. It is believed that the disclosed system and associated method bridges the gap and provides a complete practical solution.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

This application addresses the above-mentioned deficiencies. In one aspect of this application, a method and system for verifying that a user is the owner of a digital listing that is associated with a WiFi Access Point is provided. The user claims ownership of the WiFi Access Point that is associated with a digital listing of an entity/item/place/business so that the online service provider can verify and register the user as owner of the WiFi Access Point. Once verified, the user owns the WiFi Access Point and its related digital listing and configures the listing. The system includes an item information system receiving the WiFi Access Point data and associated item data, and storing the WiFi Access Point data and the item data, an owner registration and transfer system receiving owner registration data and ownership change requests and storing the ownership history, and an authentication system receiving authentication requests and generating a response based upon the information stored in the system or a connected system.

BRIEF DESCRIPTION OF THE DRAWINGS

FIG. 6b is a flow diagram of an example using the method of FIG. 6a.

DETAILED DESCRIPTION

Figure 1:
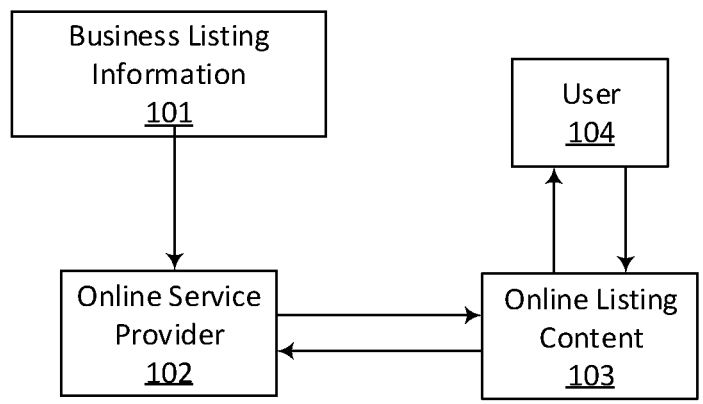
FIG. 1 is a block diagram illustrating the system of automatic authentication and management of ownership according to one embodiment of the present invention.

The technology of the present application is described with specificity herein to meet statutory requirements. However, the description itself is not intended to limit the scope of this patent application. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. The specification and drawings are, accordingly, to be regarded in an illustrative rather than a restrictive sense.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Also, it is noted that the aspects may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. Structures and functionality presented as separate components in example configurations may be implemented as a combined structure or component. Similarly, structures and functionality presented as a single component may be implemented as separate components.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented or computer-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (Access Point)).

In some example embodiments, the processors or processor-implemented modules may be located in a single geographic location (e.g., within a home environment, an office environment, or a server farm). In other example embodiments, the processors or processor-implemented modules may be distributed across a number of geographic locations.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

A "storage medium" may represent one or more devices for storing data, including read only memory (ROM), random access memory (RAM), magnetic disk storage mediums, optical storage mediums, flash memory devices and/or other computer-readable mediums for storing information. The term "computer-readable medium" includes, but is not limited to portable or fixed storage devices, optical storage devices, wireless channels and various other mediums capable of storing, containing or carrying instruction(s) and/or data.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The following abbreviations that may be found in the specification and/or the drawing figures are defined as follows:

The term WiFi is a family of wireless networking technologies, based on the IEEE 802.11 family of standards, which are commonly used for local area networking of devices and Internet access. Compatible devices can network through wireless access points to each other as well as to wired devices and the Internet. The different versions of Wi-Fi are specified by various IEEE 802.11 protocol standards. In this invention, WiFi may refer to any current IEEE 802.11 standard, or any future IEEE 802.11 standards and a wireless communications transceiver may be compliant with any current IEEE 802.11 standard, or any future IEEE 802.11 standards. The WiFi Access Points are wireless access points that are compatible with IEEE 802.11, as certified by the Wireless Fidelity (WiFi) Alliance.

A "WiFi Access Point" is a device that allows wireless devices to connect to a wired network using WiFi, or related standards. In this application it refers to a conceptual point within the WiFi network, unless otherwise specified. In the following, the terms "WiFi Access Point" and "WiFi" are often used interchangeably.

There are presently hundreds of millions of WiFi Access Points worldwide to provide wireless access services. However, there is presently no method or system of advertising where someone can place an advertisement/message for wireless devices based on WiFi Access Points in a matter of minutes and be able to broadcast it almost immediately in the neighborhood of the WiFi Access Points, thereby providing proximity marketing and advertising services.

The present invention offers such a system/method that uses WiFi Access Points for digital listing and information sharing. Such a System can be called a "Platform" and/or "The Platform" that can be used for marketing and advertising using digital listings that are associated with WiFi Access Points. Such a system/platform integrates and administers WiFi Access Points, digital listings, and listing owners in order to coordinate them for reliable and authentic digital listing and information sharing. It has advantage in terms of infrastructure costs, as a Wi-Fi network is normally already available and shared between many applications.

For example, the owner of a grocery store that has an associated WiFi Access Point at Times Square in New York City would like to place an advertisement to be broadcasted and targeted immediately for tourists at Times Square and may use the invented system/platform to accomplish this goal for mobile phones and/or other wireless devices in proximity by managing an associated digital listing associated with said WiFi Access Point.

The method and system described can be used for managing ownership of a WiFi Access Point 22 in an online platform, and they can also be used for managing ownership of digital listing that is associated with WiFi Access Point 22 in an online platform. The terms "owner of a WiFi Access Point" and "owner of a digital listing" are often used interchangeably. Similarly, the terms, user, user account, and account are often used interchangeably.

Figure 10:
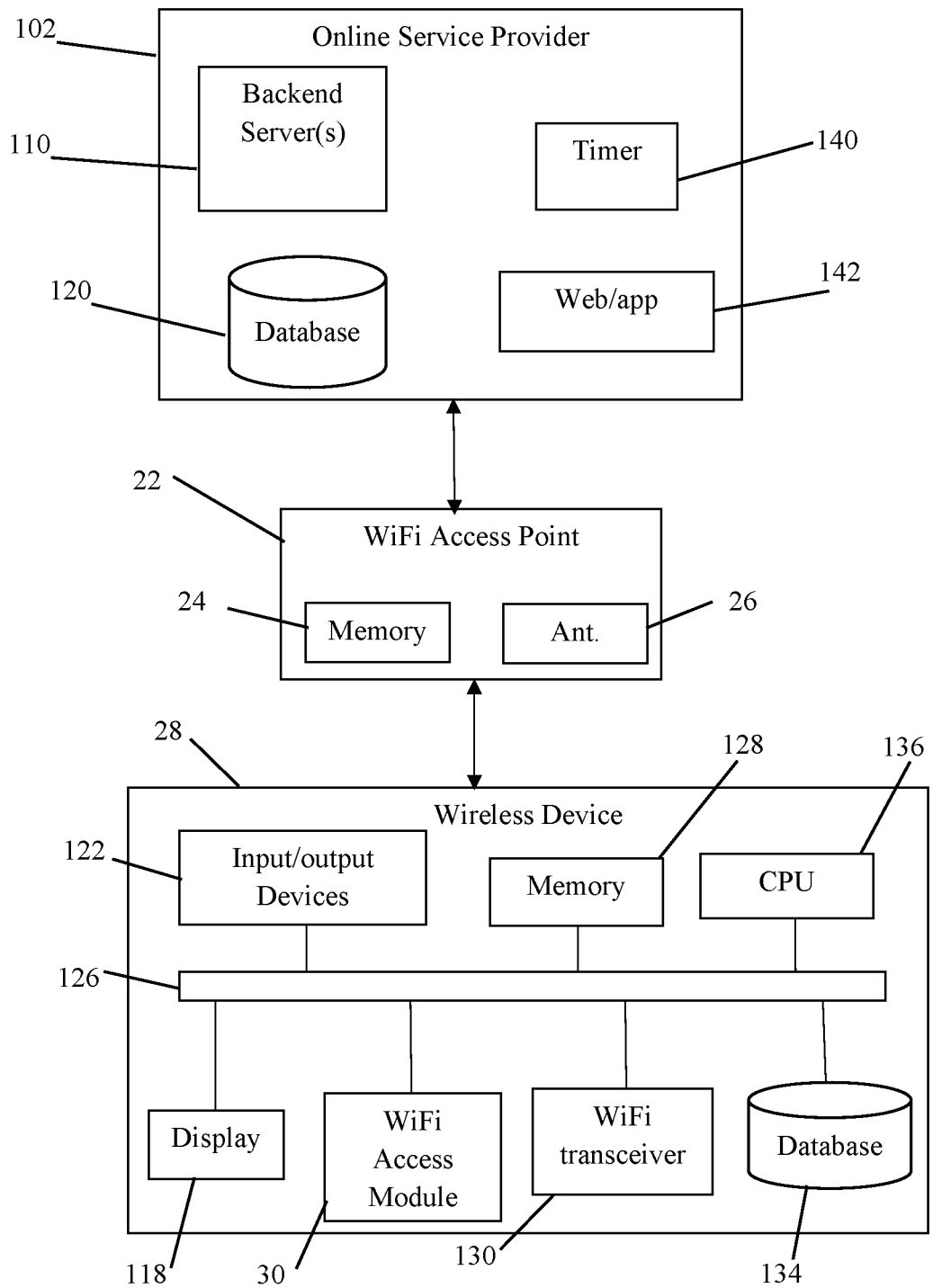
FIG. 10 is a block diagram showing further components of the system of FIG. 1.

Referring to FIG. 1, a business listing information 101, aka online listing, is provided to an online service provider 102. The provider of the business listing information 101 can be a local company, a directory publisher, or any user who would like to enable the online presence of a local business, an individual, or an object and add to the website or mobile application provided by the online service provider 102. The business listing information 101 can be any digital information of a business, an individual, or an object. For example, the business listing information 101 can be digital information of a restaurant, like a local McDonald's restaurant, a hospital, a school, a pharmacy, a Starbucks coffee shop, an office, a car, a bicycle, a desk, a window, a hill, a lake, a dog, a boy, a girl, etc. The online service provider 102 stores complete information of the business listing information 101 in an electronic form, such as a searchable database 120 (FIG. 10). The electronic form of the business listing information 101 is made available as an online listing content 103 to a user 104 or users.

The business that the new business listing information is created for should have an affiliated WiFi Access Point 22 (FIG. 10) installed, inside or close by. A user that is in proximity to the business may use his or her WiFi transceiver 130 to detect the WiFi Access Point 22. Upon detecting the WiFi Access Point 22, the online service provider 102 may show the user 104 the online listing content 103 of the business listing information 101.

Alternatively. the user 104 may type in a keyword that matches one of the words from the business listing information 101. In response, the online service provider 102 shows the user 104 an online listing content 103 of a Business Listing Information that matches the keyword. For example, if the user 104 types, "McDonald's," the user 104 is shown a list of local McDonald's restaurants. If the user 104 is at a location that is close to a McDonald's restaurant, whose business listing information 101 is in the database 120 of the online service provider 102, the online service provider 102 may show the user 104 the online listing content 103 of the McDonald's restaurant.

The online service provider 102 may identify the user 104 with a user identifier. A user identifier may be a string of letters, numbers, other characters, or any mix of them. The online service provider 102 may identify the business listing information 101 with a listing identifier. A listing identifier uniquely identifies a business listing information 101. The listing identifier may be a portion of the URL (Uniform Resource Locator) where the listing can be found, or the listing identifier may be a hidden value known only to the online service provider 102. The listing identifier may be a string of letters, numbers, or other characters.

As illustrated in FIG. 10, the WiFi Access Point 22 has an electronic silicon chip that stores a BSSID in its nonvolatile memory 24 and one or more antennas 26 which are used to send and receive RF signals. A wireless device 28 is provided in the system and has one or more antennas which are used to send and receive RF signals to the surrounding WiFi Access Points. One or more back-end servers 110 of the online service provider 102 stores the required information for all items and WiFi Access Points in the system. Thus, when the wireless device 28 gets the ID information from one or more WiFi Access Points, it can identify the corresponding associated digital listing(s) by passing the ID(s) to the back-end server 110.

The online service provider 102 may identify a WiFi Access Point 22 with a unique WiFi identifier. A WiFi identifier may be a string of letters, numbers, other characters, or any mix of them. This ID uniquely identifies the WiFi Access Point. In one example, a WiFi identifier can be an SSID (service set identifier), the primary name associated with an 802.11 wireless local area network (WLAN), including home networks and public hotspots, that client devices uses to identify and join wireless networks. In another example, a WiFi identifier is a BSSID (basic service set identifier), which is a 48-bit label that conforms to MAC-48 conventions. In another example, a WiFi identifier is a combination of BSSID and Zip Code or country code.

When a user desires to access and manage an online listing content (for instance, via a website or app program), the user often is required to register for the service or app. During registration, the user selects, creates, or is otherwise provided with one or more user credentials that serve to identify the user. Upon accessing or logging in to the service or app on occasions subsequent to the initial registration, the user is authenticated to the service or app by providing the user credentials that verify his/her identity using single-factor authentication, two-factor authentication, or any form of authentication.

Various aspects of the technology described herein generally are directed to systems, methods, and computer-readable storage media for authenticating a user to manage an online listing content 103 of a service or app provided by the online service provider 102 utilizing automatic WiFi association and authentication.

Method for Online Authentication of Ownership of a WiFi Access Point

1. Verification of WiFi Access Right (Connected to the Same WiFi as the One of Listing, No Need for a Password)

Figure 2A:
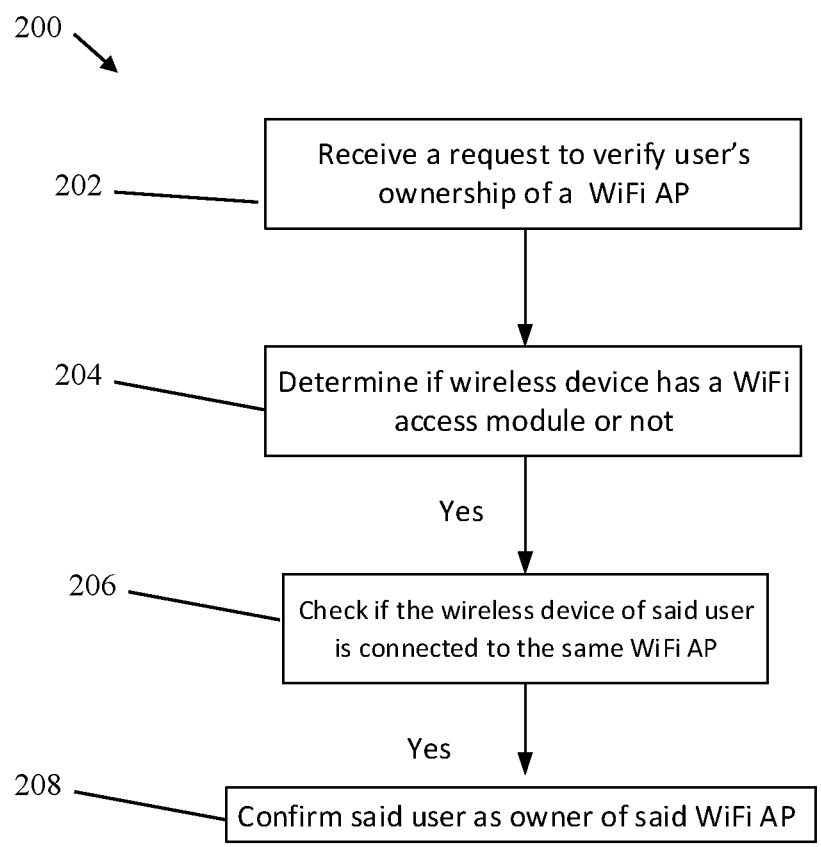
FIG. 2a is a flow diagram illustrating a method for online authentication of ownership of a WiFi Access Point by checking the WiFi connection.

FIG. 2a shows a method 200 for Online Authentication of Ownership of a WiFi Access Point that can be used by the online service provider 102 to verify that a user 104 is the true owner of a selected WiFi Access Point 22 in one embodiment of the invention. In step 202, the online service provider 102 receives a request from the user that he or she claims to be the owner of a selected WiFi Access Point 22. Upon receiving a request from the user that he or she claims to be the owner of the selected WiFi Access Point 22 in step 202, the online service provider 102 determines if the wireless device 28 of the user has a WiFi access module 30 or not in step 204.

If the wireless device 28 has a WiFi access module 30, then a web/app 142 provided by the online service provider 102 checks if the wireless device 28 of the user is connected to the same WiFi Access Point 22 in step 206. If the wireless device 28 of the user is determined in step 206 to be connected to the same WiFi Access Point 22, then the request is approved and the user is verified to be the true owner of said WiFi Access Point 22 in step 208. This verification occurs only if the wireless device 28 of the user is already connected to the selected WiFi Access Point 22. Here, a wireless device 28 that is connected to a WiFi Access Point 22 means that the wireless device 28 has passed the authentication of the WiFi Access Point 22 and can receive wireless network services provided by the WiFi Access Point 22. Once the user is verified, optionally, the online service provided can save the user as a verified owner of the WiFi Access Point 22 at a database 134, which may be located at the wireless device 28, or at a remote server.

Figure 3A:
FIG. 3a illustrates a digital listing interface that displays a form to enable a user to create or edit a digital listing.
Figure 3B:
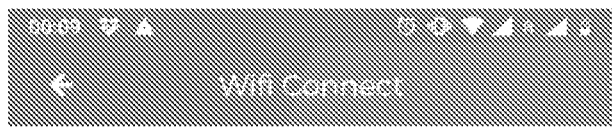
FIG. 3b illustrates a WiFi listing interface where a list of detected WiFi Access Points is displayed.

In one example of the embodiment, when user selects a WiFi from the list of WiFis displayed in the GUI of display 118 in FIG. 3b and claims to be the owner of the selected WiFi Access Point 22, the web/app 142 will check if the WiFi Access Point 22 selected is the same as the WiFi Access Point 22 that the wireless device 28 of the user is connected to. The selection is successful only if the wireless device 28 of the user is already connected to the selected WiFi.

2. Verification of WiFi Access Right (Enter Password and Confirm Connection with this Password)

Figure 2B:
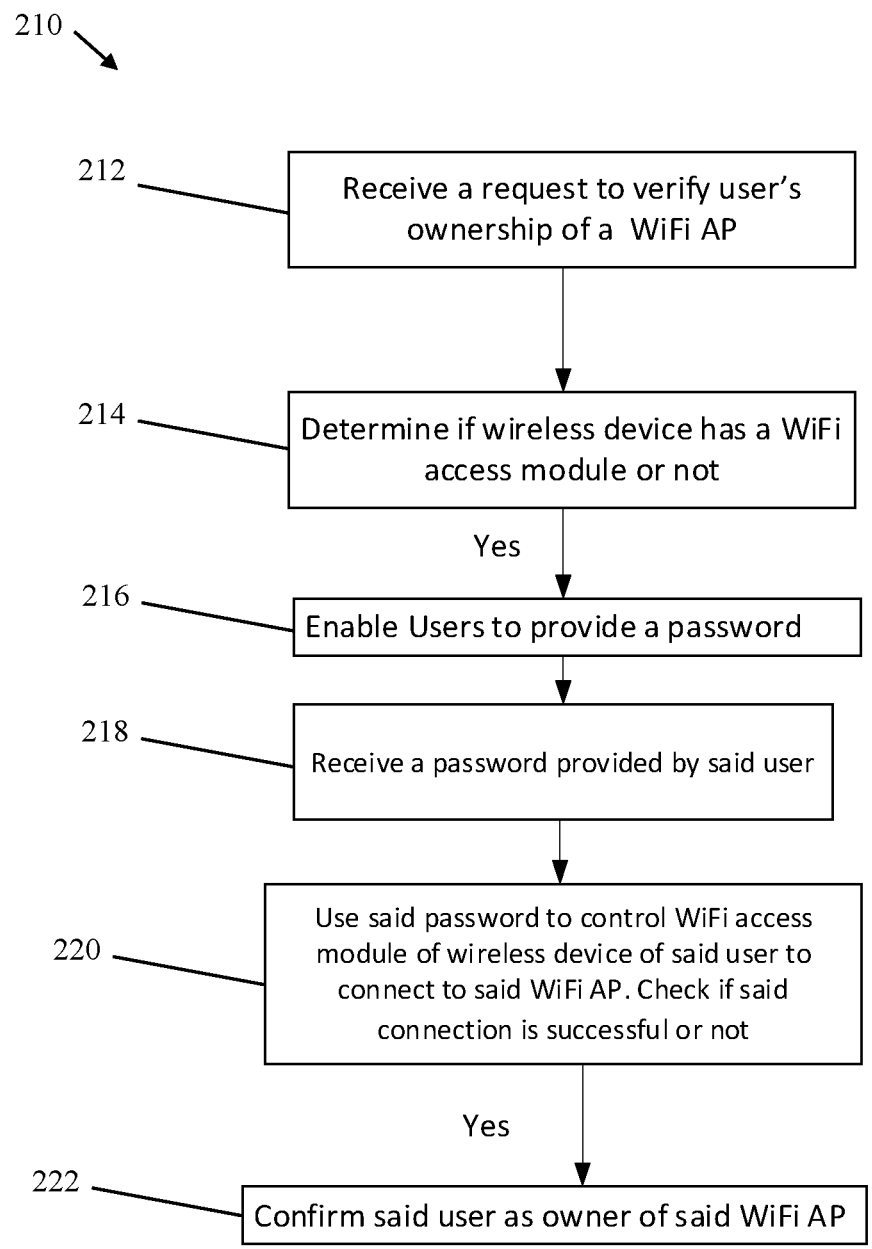
FIG. 2b is a flow diagram illustrating a method for online authentication of ownership of a WiFi Access Point by entering a password for WiFi connection.

FIG. 2b shows a method 210 for Online Authentication of Ownership of a WiFi Access Point that can be used by the online service provider 102 to verify that a user is the true owner of a selected WiFi Access Point 22 in another embodiment of the invention. In step 212, the online service provider receives a request from the user that he or she claims to be the owner of a selected WiFi Access Point. Upon receiving a request from the user that he or she claims to be the owner of the selected WiFi Access Point 22 in step 212, the online service provider 102 determines if the wireless device 28 of the user has a WiFi access module 30 or not in step 214. If the wireless device 28 has a WiFi access module 30, then the web/app 142 provided by the online service provider 102 allows the user to provide a password for connecting to the selected WiFi Access Point 22 in step 216. In step 218, the online service provider receives the password provided by the user. The web/app 142 will check if the password provided for the selected WiFi Access Point 22 is correct or not by using the WiFi access module 30 of the wireless device 28 to connect to the WiFi using the provided password in step 220. If the provided password can be used for successful authentication of connecting to the selected WiFi Access Point 22, the request is approved and the user is verified to be the true owner of the WiFi Access Point 22. Once the user is verified, optionally, the online service provider can save the user as verified owner of the WiFi Access Point at a database 134, which may be located at the wireless device 28, or at a remote server. If the provided password cannot be used for successful authentication of connecting to the selected WiFi Access Point 22, the request is denied.

In one example of the embodiment, when user selects a WiFi Access Point 22 from the list of WiFi Access Points displayed in FIG. 3b to claim as the owner of the selected WiFi Access Point 22, the user may be asked by the web/app 142 provided by online service provider 102 to input the password of the selected WiFi Access Point 22 and the web/app 142 will check if the password provided for the selected WiFi Access Point 22 is correct or not by connecting to the WiFi using the provided password. If the provided password can be used for successful authentication of connecting to the selected WiFi Access Point 22, the user is verified to be owner of the selected WiFi Access Point 22. If the provided password cannot be used for successful authentication of connecting to the selected WiFi Access Point 22, the verification is denied.

3. Verification of WiFi Access Right (Enter Password and Compare Password with One Stored in Database)

Figure 2C:
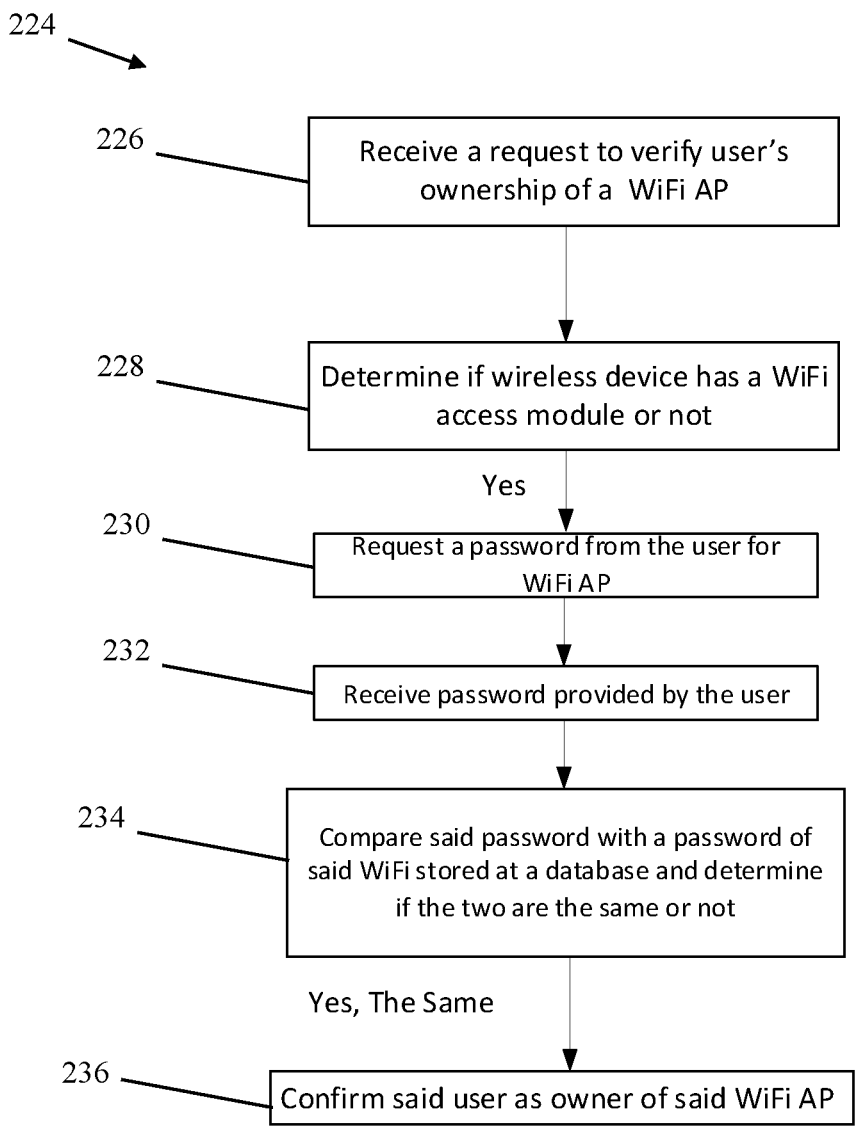
FIG. 2c is a flow diagram illustrating a method for online authentication of ownership of a WiFi Access Point by matching a password with a password stored in a database.

FIG. 2c shows a method 224 for Online Authentication of Ownership of a WiFi Access Point that can be used by the online service provider 102 to verify that a user is the true owner of a selected WiFi Access Point 22 in another embodiment of the invention. In step 226, the online service provider receives a request from the user that he or she claims to be the owner of a selected WiFi Access Point. Upon receiving a request from the user that he or she claims to be the owner of the selected WiFi Access Point 22 in step 226, the online service provider 102 determines if the wireless device 28 of the user has a WiFi access module 30 or not in step 228. If the wireless device 28 has a WiFi access module 30, then the web/app 142 provided by the online service provider 102 will ask the user to enter the password for this WiFi Access Point 22 in step 230. In step 232, the online service provider 102 receives the password provided by the user. In step 234, the online service provider compares the password with a password of the WiFi stored at the database 120 and determines if the two passwords are the same or not. If the password entered matches with the password saved in the database 120 of the online service provider, then the listing server can verify that the user is the owner of the WiFi Access Point 22 and thus the owner of the digital listing in step 236. Once the user is verified, optionally, the online service provider can save the user as verified owner of the WiFi Access Point at the database 134, which may be located at the wireless device 28, or at a remote server.

4. Verification of WiFi Admin Right (Enter Two Different Passwords Within a Time Limit and Owner has to Change WiFi Password)

Figure 2D:
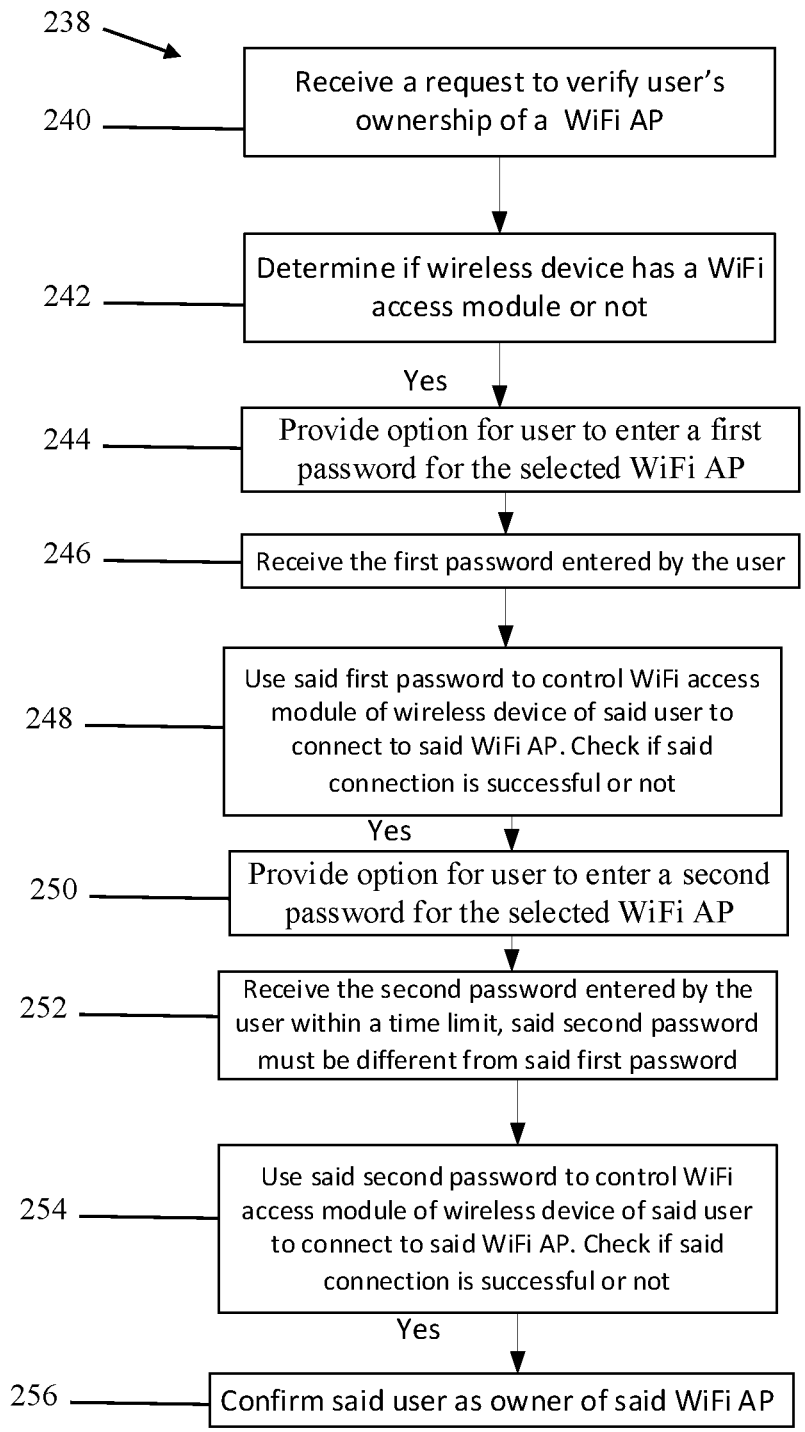
FIG. 2d is a flow diagram illustrating a method for online authentication of ownership of a WiFi Access Point by changing the WiFi password and verifying the administration right of the WiFi Access Point.

FIG. 2d shows a method 238 for Online Authentication of Ownership of a WiFi Access Point that can be used by the online service provider 102 to verify that a user is the true owner of a selected WiFi Access Point 22 in another embodiment of the invention. In step 240, the online service provider receives a request from the user that he or she claims to be the owner of a selected WiFi Access Point. Upon receiving a request from the user that he or she claims to be the owner of the selected WiFi Access Point 22 in step 240, the online service provider 102 determines if the wireless device 28 of the user has a WiFi access module 30 or not in step 242. If the wireless device 28 has a WiFi access module 30, then in step 244 the web/app 142 provided by the online service provider 102 provides an option for the user to enter a first password for the selected WiFi Access Point 22 so that the user can provide a first password for connecting to the selected WiFi Access Point 22. In step 246, the online service provider receives the first password provided by the user. In step 248, the web/app 142 checks if the first password provided for the selected WiFi Access Point 22 is correct or not by using the WiFi access module 30 of the wireless device 28 to try to connect to the WiFi using the provided first password and see if the connection is successful or not.

If the provided first password can be used for successful authentication of connecting to the selected WiFi Access Point 22, then in step 250 the web/app 142 provided by the online service provider 102 provides an option for the user to enter a second password for the selected WiFi Access Point 22 within a time limit. The second password must be different from the first password, and the user needs to change the password of the WiFi Access Point 22 to the second password and provide the second password for the second connection verification within a time limit such as 30 minutes. In step 252, the online service provider receives the second password provided by the user. In step 254, the web/app 142 checks if the second password provided for the selected WiFi Access Point 22 is correct or not by using the WiFi access module 30 of the wireless device 28 to try to connect to the WiFi using the provided second password and see if the connection is successful or not. If the provided second password can be used for successful authentication of connecting to the selected WiFi Access Point 22, then in step 256 the request is approved and the user is verified to be the true owner of the WiFi Access Point 22. In between providing the two passwords, the user may be allowed to try several other passwords that do not work. As long as the interval between the two successful verifications of the two different passwords is within a time limit, the request is approved and the user is verified to be the true owner of the WiFi Access Point 22. Once the user is verified, optionally, the online service provider may save the user as a verified owner of the WiFi Access Point at a database 134, which may be located at the wireless device 28, or at a remote server.

In one example of the embodiment, when the user selects a WiFi from the list of WiFi Access Points displayed in FIG. 3(b), the user may be asked to input a first password of the WiFi Access Point 22 and the web/app 142 will check if the first password provided for the selected WiFi Access Point 22 is correct or not by connecting to the WiFi using the first password. If the first password can be used for successful authentication of connecting to the selected WiFi Access Point 22, the user needs to provide a second password for connecting to the WiFi Access Point 22 within a time limit from the first successful verification. The second password must be different from the first password. Web/app 142 will check if the second password provided for the selected WiFi Access Point 22 is correct or not by connecting to the WiFi using the second password. If the second password can be used for successful authentication of connecting to the selected WiFi Access Point 22, the request is approved and the user is verified to be the true owner of the WiFi Access Point 22. If the provided second password cannot be used for successful authentication of connecting to the selected WiFi Access Point 22, the request is denied.

5. Verification of WiFi Access Right (Enter Password Provided by Web/App)

Figure 2E:
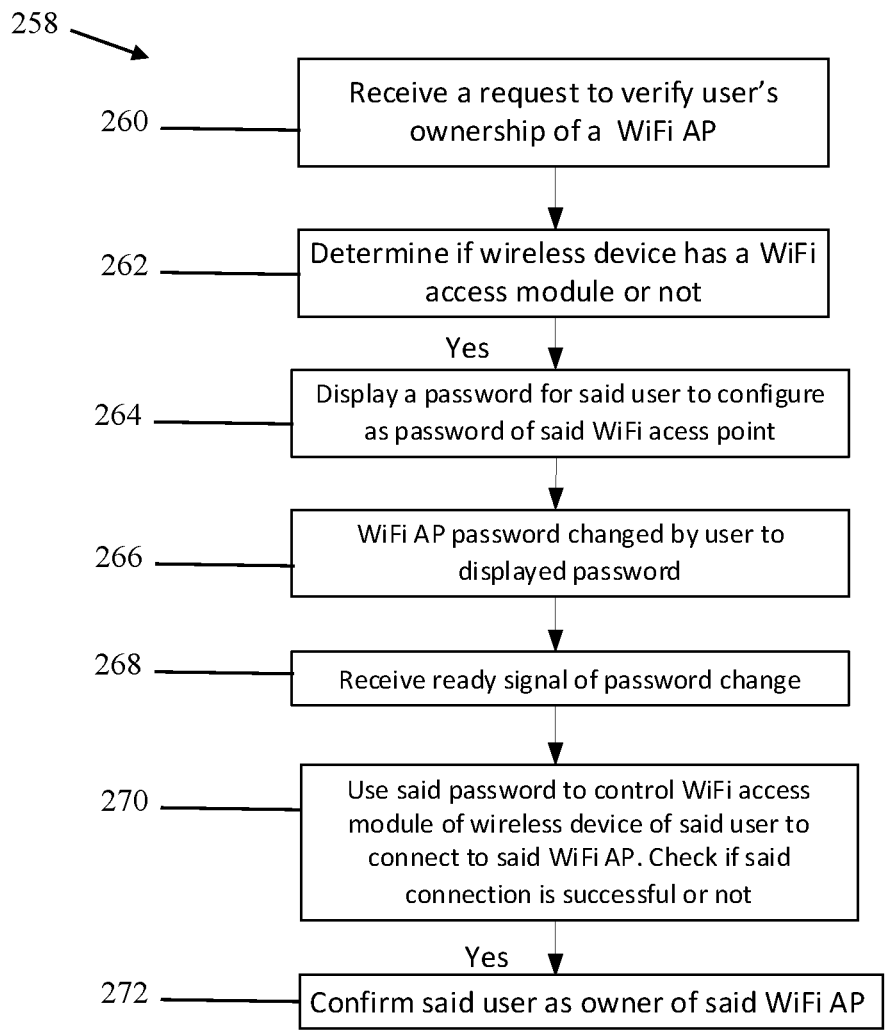
FIG. 2e is a flow diagram illustrating a method for online authentication of ownership of a WiFi Access Point by configuring the WiFi Access Point with a displayed password.

FIG. 2e shows a method 258 for Online Authentication of Ownership of a WiFi Access Point that can be used by the online service provider 102 to verify that a user is the true owner of a selected WiFi Access Point 22 in another embodiment of the invention. In step 260, the online service provider receives a request from the user that he or she claims to be the owner of a selected WiFi Access Point. Upon receiving a request from the user that he or she claims to be the owner of the selected WiFi Access Point 22 in step 260, the online service provider 102 determines if the wireless device 28 of the user has a WiFi access module 30 or not in step 262. If the wireless device 28 has a WiFi access module 30, then in step 264 the web/app 142 provided by the online service provider 102 displays in display 118 a password to the user that is generated by the online service provider 102 for the user to change the password of the WiFi Access Point 22 to the password displayed by web/app 142 for providing WiFi services. In step 266, the user changes the password of the WiFi Access Point 22 to the password displayed by the web/app 142 for providing WiFi services. After the password change is done, in step 268, the web/app 142 receives a ready signal sent by the user to indicate that the password has been changed. For example, the ready signal can be clicking a Ready button provided by web/app 142 of the online service provider 102. In step 270, the web/app 142 uses the WiFi access module 30 of the wireless device 28 to try to connect to the WiFi Access Point 22 using the displayed password and see if the connection is successful or not. If the displayed password can be used for successful authentication of connecting to the selected WiFi Access Point 22, the request is approved and the user is verified to be the true owner of the WiFi Access Point 22 in step 272. Optionally, the online service provider may save the user as a verified owner of the WiFi Access Point at a database 134, which may be located at the wireless device 28, or at a remote server. If the displayed password cannot be used for successful authentication of connecting to the selected WiFi Access Point 22, the request is denied.

In one example of the embodiment, when the user selects a WiFi Access Point 22 from the list of WiFi Access Points displayed in the GUI of FIG. 3b to claim as the owner of the selected WiFi Access Point 22, any method that is introduced above and illustrated in FIG. 2a-FIG. 2e can be used to verify the ownership. For example, when the method in FIG. 2e is used, a password is displayed. The user has to configure his WiFi Access Point 22 to use the displayed password as the password for access WiFi services. After the password change is done, the user sends a ready signal to web/app 142. The ready signal can be clicking a Ready button provided by the web/app 142 of the online service provider 102. After receiving the ready signal, the web/app 142 will check if the displayed password for the selected WiFi Access Point 22 is correct or not by connecting to the WiFi using the displayed password. If the displayed password can be used for successful authentication of connecting to the selected WiFi Access Point 22, the user is verified to be owner of the selected WiFi Access Point 22. If the displayed password cannot be used for successful authentication of connecting to the selected WiFi Access Point 22, the verification is denied.

Business Listing Information and WiFi Association

The business that a new business listing information is created for should have an affiliated WiFi Access Point 22 installed, inside or close by. The user has to be in proximity to the local business and its WiFi Access Point 22 so that the wireless device 28 that the user is using can detect the WiFi signals from the WiFi Access Point of the local business for the ownership management of the business listing information 101.

In one embodiment of the invention, when a user wants to create a new business listing information 101 to the website or mobile application provided by the online service provider 102, the user first signs in for the service or app utilizing a particular computing device (e.g., a mobile telephone, a tablet, a laptop PC, a smart band or watch, a computer, a PDA, etc.) that has a WiFi communications transceiver module. The computer device has access to Internet. The wireless communications transceiver may in some implementations be compliant with any current IEEE 802.11 standard, or any future IEEE 802.11 standards.

In one embodiment of the invention, when a user wants to create a new business listing information 101 to the website or mobile application provided by the online service provider 102, the user may choose not to sign in and as a guest user, use the service or app utilizing a particular computing device (e.g., a mobile telephone, a tablet, a laptop PC, a smart band or watch, a computer, a PDA, etc.) that has a WiFi access module 30.

In one embodiment of the invention, the user may choose to create a new business listing information or edit an existing business listing information and associate a WiFi Access Point 22 with the business listing information. In one example, as shown in FIG. 3a, the user may choose to add and create a new business listing, named "Site". In the GUI, the user may enter the name of the site, description, address, and pictures. In addition, the user should select a WiFi Access Point 22 associated with this business listing by clicking the "Select wifi" button. Then, the user is displayed the GUI in FIG. 3b, where a list of WiFi Access Points detected by the WiFi module of the wireless device 28 is displayed. The user can select the WiFi Access Point for the local business, which shall be saved by the website or mobile app into the database 120 of the online service provider 102. After selecting the WiFi for the business listing, it goes back to the GUI of FIG. 3a. Upon clicking on Submit to submit a request to create a new digital listing, the business listing is created and saved in the database 120 of the online service provider 102. The selected WiFi Access Point is associated with the particular listing and the association relationship is saved in database 120. The information related to the selected WiFi is stored in the database 120 of the online service provider.

The digital listing may be created or added by the owner of the business or the owner of the WiFi Access Point 22. The digital listing may be created or added by any user. In one example, a customer enjoying meal at a restaurant may add a digital listing of the restaurant and associate a WiFi Access Point of the restaurant to the digital listing. In another example, a library owner may add a digital listing of the library and associate a WiFi Access Point of the library to the digital listing.

Figure 4:
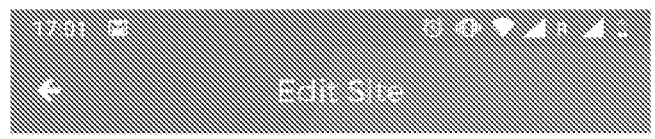
FIG. 4 is a Digital Listing Management interface that enables a user to submit a request to update the digital listing after selecting the WiFi Access Point from the list displayed in FIG. 3b.
Figure 4:
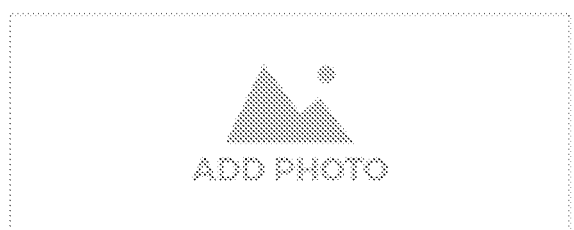

In one embodiment of the invention, the digital listing may have already existed on the database 120 and can be displayed on the web/app 142 provided by the online service provider 102. A user may choose to edit and update the existing digital listing. In one example, the user may use GUI in FIG. 4 to edit an existing site. In FIG. 4, the user may click "Select wifi" to enter the page to select a WiFi Access Point 22 for this digital listing. For example, the user may enter the page as illustrated in FIG. 3b, where a list of detected WiFi Access Points nearby is displayed. Then, the user may select one WiFi Access Point 22 and the selected WiFi Access Point 22 will be associated with the digital listing after the user clicks the "Update" button in FIG. 4 to submit a request to update the digital listing and the association is updated and saved in the database 120 of the online service provider 102.

In one embodiment of the invention, once a WiFi Access Point 22 is already associated with an existing digital listing provided by the online service provider 102, the association is not allowed to be changed. A user may choose to edit and update an existing digital listing that has already been associated with a WiFi Access Point 22. In one example, the user may use GUI in FIG. 4 to edit an existing site that has already been associated with a WiFi Access Point 22, however, the "Select wifi" function is either disabled or hidden as the user is not allowed to select another WiFi Access Point 22 for this site. With this embodiment, the current owner of a WiFi Access Point 22 only needs to edit and update the same digital listing, even if the WiFi Access Point 22 is associated with a digital listing by another person, the WiFi Access Point 22 is moved to another location or used in a different business, or the ownership of the WiFi Access Point 22 is transferred to another person.

WiFi Access Point Associated with Only One Digital Listing

In one embodiment of the invention, allow only one digital listing associated with a WiFi Access Point 22. When the user selects a WiFi Access Point 22 from the list of WiFi Access Points displayed in FIG. 3, web/app 142 will check if the selected WiFi Access Point 22 has been associated with another digital listing or not. If the selected WiFi Access Point 22 has not been associated with any digital listing yet, the selection is successful. Otherwise, the selection is not allowed.

Only WiFi Owner is Allowed to Associate WiFi with a Digital Listing

In another embodiment of the invention, only the true owner of a WiFi Access Point 22 is allowed to associate the WiFi Access Point 22 with a newly created or existing digital listing and the online service provider 102 uses a method for Online Authentication of Ownership of a WiFi Access Point introduced above to verify that the user is the true owner of the WiFi Access Point 22. After selecting a WiFi Access Point 22 for association with a digital listing, the Method for Online Authentication of Ownership of a WiFi Access Point is used to verify that the user is the true owner of the WiFi Access Point 22. Once the user is verified to be the true owner of the WiFi Access Point 22, the WiFi Access Point 22 can be associated with the digital listing.

In one example of using the Method for Online Authentication of Ownership of a WiFi Access Point to verify that the user is the true owner of the WiFi Access Point 22, the user may be asked to connect to the WiFi Access Point 22 when associating the WiFi to the digital listing. In one example, when the user selects a WiFi from the list of WiFis displayed in FIG. 3, web/app 142 will check if the WiFi Access Point 22 selected is the same as the WiFi Access Point 22 that the wireless device 28 of the user is connected to. The selection is successful only if the wireless device 28 of the user is already connected to the selected WiFi. Here, a device is connected to a WiFi Access Point 22 means the device has passed the authentication of the WiFi Access Point 22 and can receive wireless network services provided by the WiFi Access Point 22.

The other embodiments of the Method for Online Authentication of Ownership of a WiFi Access Point to verify that the user is the true owner of the WiFi Access Point 22 as introduced above may also be used here.

Ownership Claim for Digital Listings without an Owner

In the web and app, a digital listing may be associated with a WiFi Access Point 22. In the following, we focus only on a digital listing that is associated with a WiFi Access Point 22. In order for a user to manage the digital listing, the user needs to be the owner of the digital listing; equivalently, the user needs to be the owner of the associated WiFi Access Point 22. A user is the owner of a WiFi Access Point 22, is equivalent to saying, a user is the owner of a digital listing. The terms "owner of a WiFi Access Point" and "owner of a digital listing" are often used interchangeably. The method and system described can be used for managing ownership of a WiFi Access Point 22 in an online platform, and they can also be used for managing ownership of digital listing that is associated with WiFi Access Point 22 in an online platform. Similarly, the terms, user, user account, and account are often used interchangeably.

If a user owns the WiFi access point and can prove that he is the true owner of the WiFi access point, then we can link the user's account to the WiFi access point, and thus link to the business listing In one embodiment, when an online service provider shows the user one of the searchable listings online, the online service provider also gives the user an option for the user to claim ownership of the listing. In one embodiment, the option takes the form of a checkbox. In another embodiment, the option is presented with a button or any other structure that allows the user to make a selection.

In one embodiment of the invention, the user may want to claim as the owner of a digital listing that has not been owned by any user yet. The digital listing has an associated WiFi Access Point 22, which is located at the business that the business listing information is created for. The user has to be in proximity to the business and the WiFi Access Point 22 so that the wireless device 28 the user is using can detect the WiFi signals from the WiFi Access Point 22 of the business when creating or editing the business listing information 101.

Upon logging in the particular service or app, the user opens the online listing content 103 to enter a GUI for this online listing content 103. An example of the GUI is given in FIG. 5, which is a digital listing provided by the online service provider 102. In this example, the digital listing is associated with the WiFi Access Point 22 whose SSID is ARRIS-345D. The GUI for the online listing content 103 provides an option for the user to select to claim to be the owner of the online listing content 103. For example, in FIG. 5, the user can click on the button "Claim this site" to enter the page for claiming to be the owner of this digital listing.

Figure 5:
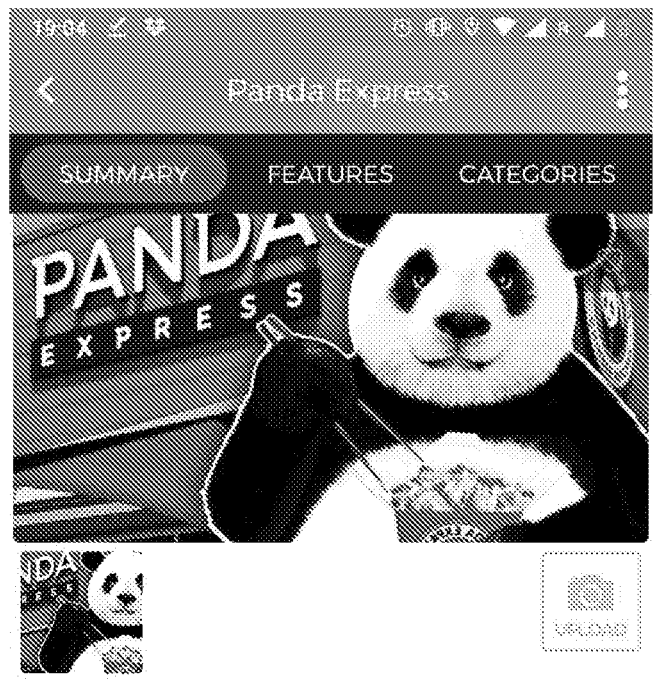
FIG. 5 is a graphic user interface of a digital listing.
Figure 6A:
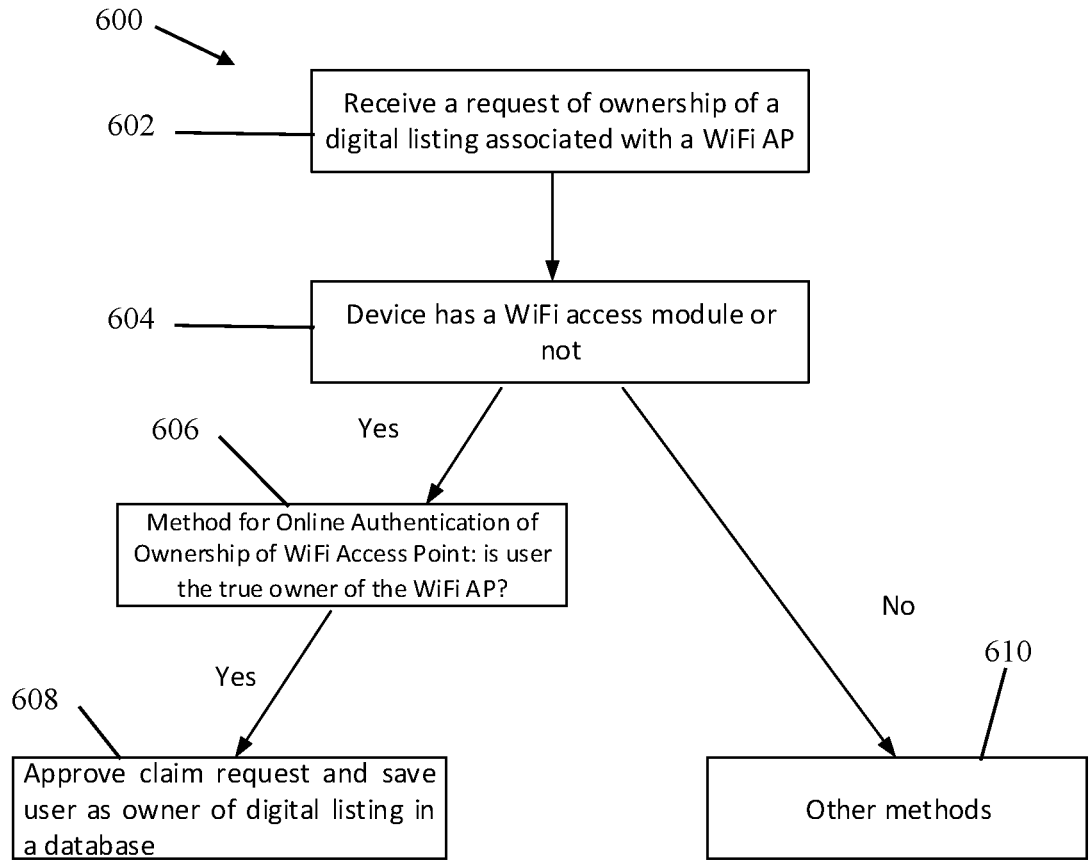
FIG. 6a is a flow diagram illustrating a method for automatic owner verification for a digital listing without an owner yet.

In one embodiment of the invention, upon selecting the option to claim to be the owner of the online listing content 103, for example by clicking the button "Claim this site" in FIG. 5, the web/app 142 will use a method 200, 210, 224, 238, or 258 for Online Authentication of Ownership of a WiFi Access Point as introduced above to verify that the user is the true owner of the WiFi Access Point 22 associated with the digital listing, as illustrated in FIG. 6*a*. In particular, this method 600 begins in step 602, where the online service provider receives a request from the user that he or she claims to be the owner of a digital listing associated with a WiFi Access Point 22. Upon receiving a request from the user that he or she claims to be the owner of the digital listing associated with the WiFi Access Point 22 in step 602, the online service provider 102 determines if the wireless device 28 of the user has a WiFi access module 30 or not in step 604. If the wireless device 28 has a WiFi access module 30, then in step 606 the online service provider determines whether the user is the true owner of the WiFi Access Point 22 using one of the above-mentioned methods (200, 210, 224, 238, or 258) for the online authentication of ownership of the WiFi Access Point. If it is determined and verified that the user is the true owner of the WiFi Access Point 22, then in step 608 the online service provider approves the claim request and saves the user as the owner of the digital listing in a database 134 and the user is authorized to manage the digital listing. If it is determined that the wireless device 28 does not have a wireless access module, then in step 610 other methods are used to try to verify that if the user is the true owner of the WiFi Access Point 22.

Figure 6B:
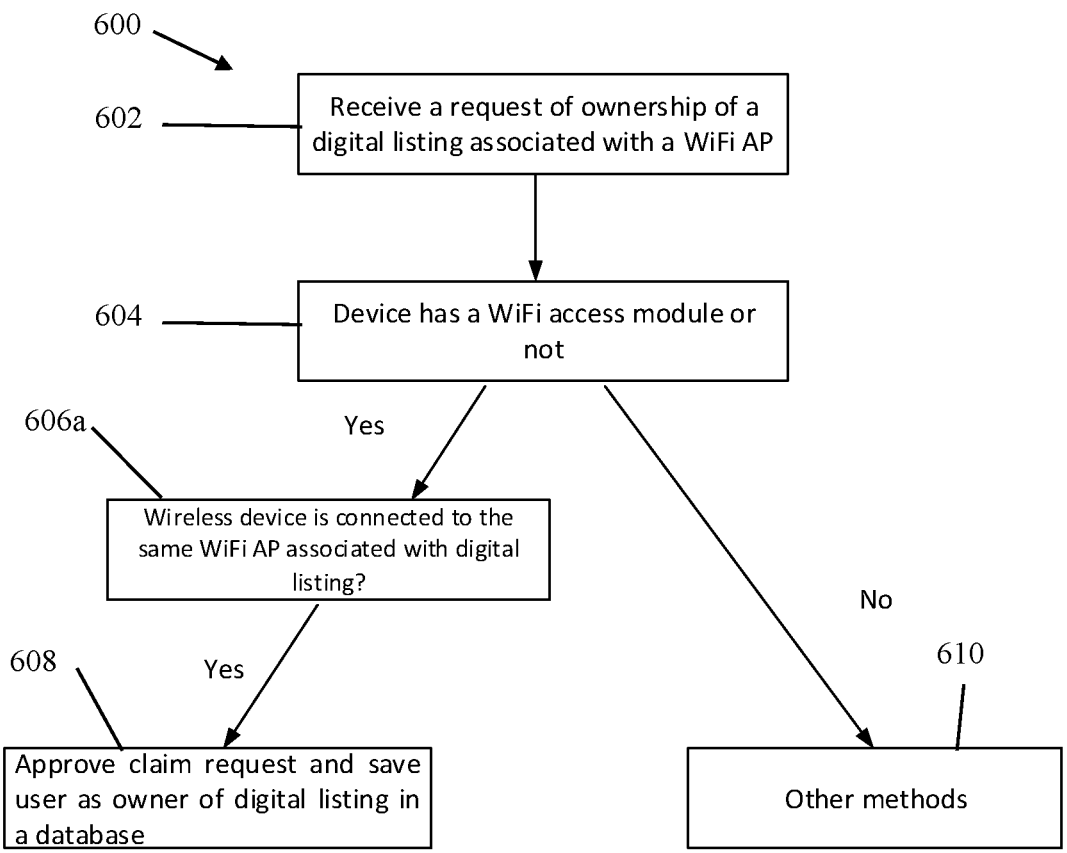

One example 600 of using the Method for Online Authentication of Ownership of a WiFi Access Point to verify that the user is the true owner of the WiFi Access Point 22 associated with the digital listing and thus for automatic owner verification for a digital listing that has no owner yet uses the method 200 and is illustrated in FIG. 6*b*. In step 606*a*, the online service provider determines whether the user is the true owner of the WiFi Access Point 22 by having the web/app 142 provided by the online service provider 102 check if the wireless device 28 of the user is connected to the WiFi Access Point 22 associated with the digital listing. If it is determined and verified that the user is the true owner of the WiFi Access Point 22, then in step 608 the online service provider approves the claim request and saves the user as the owner of the digital listing in a database and is authorized to manage the digital listing. In essence, the request is approved and the user is verified to be the true owner of the WiFi Access Point 22 associated with the digital listing only if the wireless device 28 of the user is already connected to the selected WiFi Access Point 22. Here, a device is connected to a WiFi Access Point 22 means the device has passed the authentication of the WiFi Access Point 22 and can receive wireless network services provided by the WiFi Access Point 22. If it is determined that the wireless device 28 does not have a wireless access module, then in step 610 other methods are used to try to verify that the user is the true owner of the WiFi Access Point 22 and/or approve the claim request and save the user as the owner of the digital listing in the database 134.

In one example of using the Method for Online Authentication of Ownership of a WiFi Access Point to verify that the user is the true owner of the WiFi Access Point 22 associated with the digital listing, upon receiving request from the user that he claims as the owner the WiFi Access Point 22 associated with the digital listing, the web/app 142 provided by the online service provider 102 provides an option for the user to enter a password for the WiFi Access Point 22 associated with the digital listing. The user will provide a first password for connecting to the WiFi Access Point 22 associated with the digital listing. The web/app 142 will check if the first password provided for the WiFi Access Point 22 associated with the digital listing is correct or not by using the WiFi access module 30 of the wireless device 28 to connect to the WiFi associated with the digital listing using the provided first password. If the provided first password can be used for successful authentication of connecting to the WiFi Access Point 22 associated with the digital listing, the user needs to change the password of the WiFi Access Point 22 to a second password and provide the second password for the second connection verification within a time limit, e.g. 30 min, and the second password must be different from the first password. In between providing the two passwords, the user may be allowed to try several other passwords that do not work. As long as interval between the two successful verifications of the two different passwords is within a time limit, the request is approved and the user is verified to be the true owner of the WiFi Access Point 22 associated with the digital listing. A timer 140 is used for the timing.

The other embodiments of the Method for Online Authentication of Ownership of a WiFi Access Point can be used to verify that the user is the true owner of the WiFi Access Point 22 can be found in the paragraphs above.

Transfer Ownership for Digital Listings from an Existing Owner to a New Owner

In one embodiment of the invention, there's already an existing owner for a digital listing content 103 provided by the online service provider. A user may want to claim as the new owner of a digital listing and replace the existing owner. The digital listing has an associated WiFi Access Point 22, which is located at the business that the business listing information is created for.

The user is in proximity to the business and its WiFi Access Point 22 so that the wireless device 28 the user is using can detect the WiFi signals from the WiFi Access Point 22 of the local business when claiming as the new owner of the business listing information 101.

When a user wants to claim as the new owner of a business listing information 101 to the website or mobile application provided by the online service provider 102 upon logging in the particular service or app, the user opens the online listing content 103 to enter a GUI for this online listing content 103. Then, the user may claim ownership of the digital listing or request ownership transfer from existing owner so that the user is the new owner.

Figure 7:
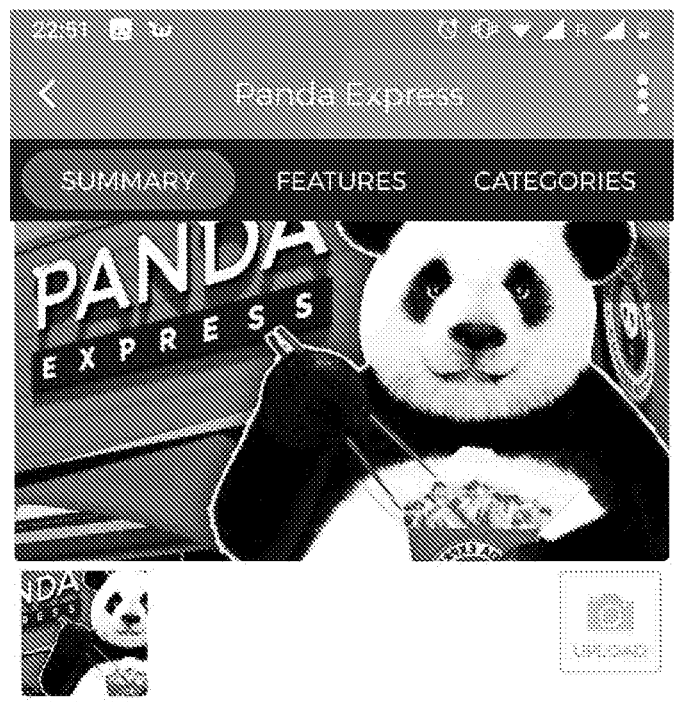
FIG. 7 is a graphic user interface of the digital listing of FIG. 5 but with the digital listing being claimed and owned by another user.
Figure 8:
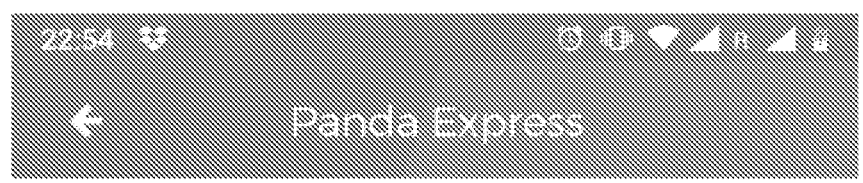
FIG. 8 is a graphical user interface that illustrates enabling a user to request ownership transfer from an existing owner to the user.
Figure 8:
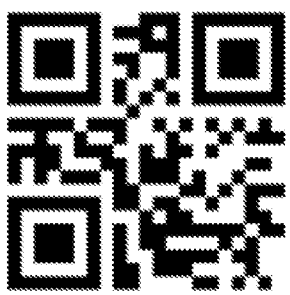
Figure 8:

An example of the GUI is given in FIG. 7, which is a digital listing provided by the online service provider 102. In this example, the digital listing is associated with the WiFi Access Point 22 whose SSID is ARRIS-345D. The online listing content 103 has been claimed and owned by another user and that is why the status "Claimed" is shown in FIG. 7. The user would like to claim as the new owner of the online listing content 103. In this case, the user may select an option provided by web/app 142 to start the claiming process. In one example of the embodiment, the user may click on a link or an URL to initiate the claiming procedures. In one example of the embodiment, the user may click on a button named "Request Ownership", as illustrated in FIG. 8, to start the claiming process and request ownership transfer from existing owner so that the user is the new owner.

Figure 9A:
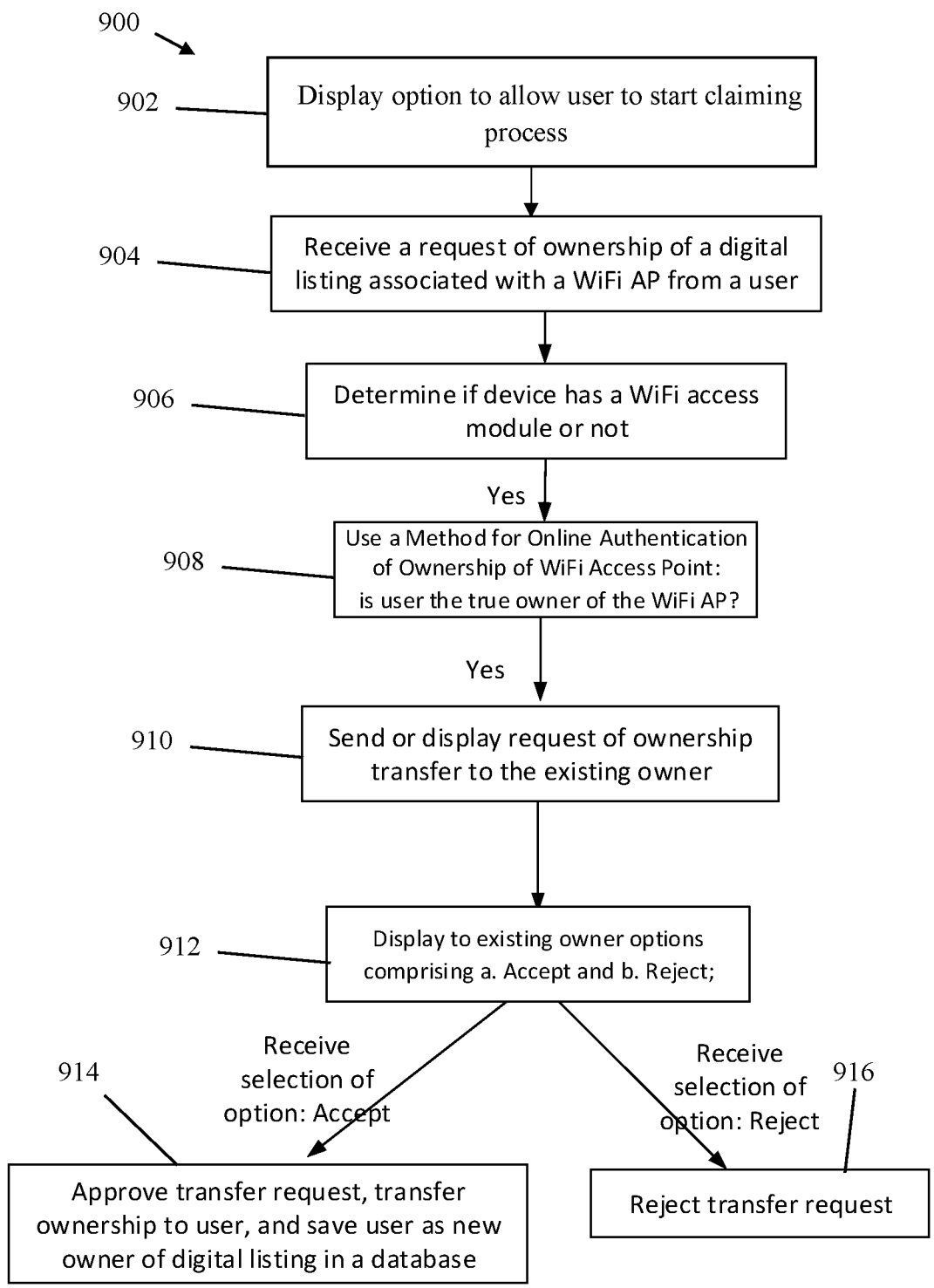
FIG. 9a is a flow diagram illustrating a method for requesting ownership transfer with rejecting the request to transfer ownership without the need of ownership verification.

FIG. 9*a* illustrates one method 900 for claiming as the new owner of a digital listing content 103 in one embodiment of the invention. As illustrated in FIG. 9a, the user selects an option provided by the web/app 142 to start the claiming process in step 902. In step 904, the online service provider 102 receives a request for ownership of a digital listing associated with a WiFi Access Point 22 from the user after the user has selected the option provided by web/app 142 to start the claiming process and requested transfer of ownership from existing owner to the user.

After the online service provider 102 receives the request, the web/app 142 of the online service provider 102 determines if the wireless device 28 of the user has a WiFi access module 30 or not in step 906. If the wireless device 28 has a WiFi access module 30, the web/app 142 of the online service provider 102 uses a method for Online Authentication of Ownership of a WiFi Access Point as introduced above to verify that the user is the true owner of the WiFi Access Point 22 associated with the digital listing in step 908. Once the Method for Online Authentication of Ownership of a WiFi Access Point verifies that the user is the true owner of the WiFi Access Point 22 associated with the digital listing, a request for ownership transfer is sent or displayed on the display 118 to the current existing owner in step 910. In the request for ownership, the user may provide a note explaining why he would like to claim the ownership.

Provide Options to Existing Owner

After displaying the request for ownership transfer to the current owner in step 910, the online service provider 102 displays to the existing owner on display 118 options in step 912. The options provided to the existing/current owner by the online service provider 102 using app or website comprises: a). Accept; b). Reject. Some other options may also be provided.

Option a). Accept

If the existing owner takes option a). Accept, the request for ownership from the requesting user is approved and the ownership of the digital listing content 103 is transferred to the user and the new ownership is saved in the database 120 of the online service provider 102 in step 914.

Option b). Reject

If the existing owner takes option b). Reject, the rejection is successful and the ownership of the digital listing content 103 is not changed and the Request for Ownership from the user is rejected in step 916.

2: Online Auto WiFi Ownership Verification Before Rejection

Figure 9B:
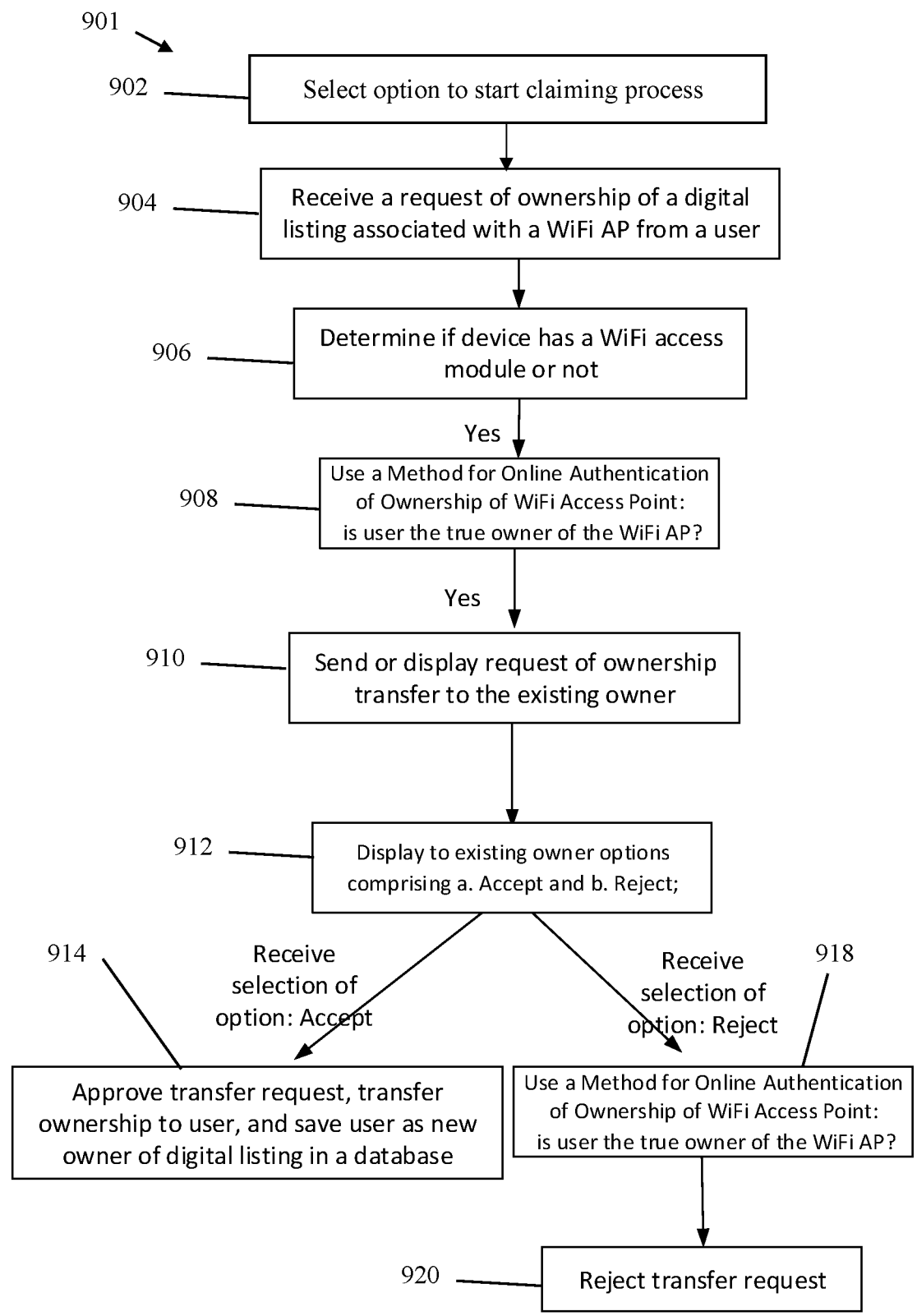
FIG. 9b is a flow diagram illustrating a method for requesting ownership transfer with rejecting the request to transfer ownership with the need of ownership verification.

FIG. 9b illustrates another method 901 for claiming as the new owner of a digital listing content 103 in one embodiment of the invention, if the existing owner takes option b). Reject in step 912 of the method shown in FIG. 9a. If the existing owner takes option b). Reject, the web/app 142 uses a method for Online Authentication of Ownership of a WiFi Access Point as introduced above to verify that the existing owner is the true owner of the WiFi Access Point 22 associated with the digital listing in step 918. Once the Method for Online Authentication of Ownership of a WiFi Access Point verifies that the existing owner is the true owner of the WiFi Access Point 22 associated with the digital listing, the rejection of ownership transfer is successful and the ownership of the digital listing content 103 is not changed and the Request for Ownership from the user is rejected in step 920. All of the other steps are similar to that of the method shown in FIG. 9a.

Optional Additional Options

In addition to options a). Accept; b). Reject, other options may also be provided by service online provider 102. For example, option c). No response within a time limit, option d). Dispute request, and so on.

If the existing owner does not take option a) or take option b) and reject the Request for Ownership successfully within a time limit, e.g. 10 days, option c) is automatically considered taken by the existing owner.

Option c). No Response within a Time Limit

1: Disclaim the Ownership

In one embodiment of the invention, if the existing owner takes option c). No response within a time limit, the existing ownership of the digital listing content 103 is removed and the digital listing content 103 is no longer owned by any user and the corresponding status is updated and saved in database 134.

2: Transfer Ownership to New User

In another embodiment of invention, if the existing owner takes option c). No response within a time limit, the Option a). accept is automatically taken and the ownership of the digital listing content 103 is transferred to the user who sends the request for ownership and the new ownership is saved in the database 120 of the online service provider 102.

Option d). Dispute Request

If the existing owner takes option d). Dispute request, the existing owner may send a dispute request with an optional note explaining why the dispute is raised to a mediator of the online service provider 102. The mediator of the online service provider 102 may investigate the transfer request and take additional actions regarding the ownership of the WiFi Access Point 22. For example, the mediator of the online service provider 102 may ban the user from claiming the digital listing or ban the user from claiming any digital listing. The mediator of the online service provider 102 may approve the transfer request and transfer ownership of the digital listing to the requesting user. Or the mediator of the online service provider 102 may deny the transfer request and the ownership of the digital listing is not changed.

Although various embodiments of the disclosed method and system for automatic authentication and management of ownership have been shown and described, modifications may occur to those skilled in the art upon reading the specification. The present application includes such modifications and is limited only by the scope of the claims.

What is claimed is:

1. A non-transitory computer-readable storage medium, having embodied thereon a program executable by a processor to perform a method for online authentication of ownership of a WiFi Access Point, the method comprising:
receiving from a user at a wireless device a request for ownership of said WiFi Access Point;
providing an option for the user to enter a first password;
receiving said first password entered by the user;

controlling a WiFi access module to connect to said WiFi Access Point using said first password;

after changing, by the user, the password of the WiFi Access Point to a second password;

connecting said WiFi access module to said WiFi Access Point using said second password within a time limit from the successful verification that said first password is used to connect said Wifi access module to said Wifi Access Point, wherein said second password must be different from said first password; and if said second password can be used to connect said WiFi access module to said WiFi Access Point, confirming the user is the true owner of said WiFi Access Point.

2. The non-transitory computer-readable storage medium of claim 1, wherein said method for online authentication of ownership of a WiFi Access Point further comprising:

receiving a request for creating a digital listing from the user;

creating said digital listing and saving said digital listing in a database; and associating said digital listing with said WiFi Access Point and saving said association relationship in said database.

3. The non-transitory computer-readable storage medium of claim 1, wherein said method for online authentication of ownership of a WiFi Access Point further comprising:

receiving a request for updating a digital listing from the user;

updating said digital listing and saving said digital listing in a database; and associating said digital listing with said WiFi Access Point and saving said association relationship in said database.

4. A non-transitory computer-readable storage medium, having embodied thereon a program executable by a processor to perform a method for online authentication of ownership of a WiFi Access Point, the method comprising:

receiving from a user at a wireless device a request for ownership of a selected WiFi Access Point by the user;

providing an option for the user to enter a first password;

receiving said first password entered by the user;

controlling a WiFi access module to connect to said WiFi Access Point using said first password; and confirming the user is the true owner of said WiFi Access Point if said first password can be used to connect said WiFi access module to said WiFi Access Point.

5. The non-transitory computer-readable storage medium of claim 4, wherein said method for online authentication of ownership of a WiFi Access Point further comprising:

receiving a request for creating a digital listing from the user;

creating said digital listing and saving said digital listing in a database; and associating said digital listing with said WiFi Access Point and saving said association relationship in said database.

6. The non-transitory computer-readable storage medium of claim 4, wherein said method for online authentication of ownership of a WiFi Access Point further comprising:

receiving a request for updating a digital listing from the user;

updating said digital listing and saving said digital listing in a database; and associating said digital listing with said WiFi Access Point and saving said association relationship in said database.

7. A non-transitory computer-readable storage medium, having embodied thereon a program executable by a processor to perform a method for online authentication of ownership of a WiFi Access Point, the method comprising:

receiving from a user at a wireless device a request for ownership of a selected WiFi Access Point by the user;

displaying a password to the user;

after the user changes the password of said WiFi Access Point to the displayed password, controlling a WiFi access module to connect to said WiFi Access Point using said password;

if said password can be used to connect said WiFi access module to said WiFi Access Point, confirming the user is the true owner of said WiFi Access Point.

8. The non-transitory computer-readable storage medium of claim 7, wherein said method for online authentication of ownership of a WiFi Access Point further comprising:

receiving a request for creating a digital listing from the user;

creating said digital listing and saving said digital listing in a database; and associating said digital listing with said WiFi Access Point and saving said association relationship in said database.

9. The non-transitory computer-readable storage medium of claim 7, wherein said method for online authentication of ownership of a WiFi Access Point further comprising:

receiving a request for updating a digital listing from the user;

updating said digital listing and saving said digital listing in a database; and associating said digital listing with said WiFi Access Point and saving said association relationship in said database.

10. A non-transitory computer-readable storage medium, having embodied thereon a program executable by a processor to perform a method for online authentication of ownership of a WiFi Access Point, the method comprising:

receiving from a user at a wireless device a request for ownership of a selected WiFi Access Point from a user;

checking if said selected WiFi Access Point is the same as the WiFi Access Point that the wireless device of said user is connected to; and if said selected WiFi Access Point is the same as the WiFi Access Point that the wireless device of said user is connected to, confirming the user is the true owner of said WiFi Access Point.

11. The non-transitory computer-readable storage medium of claim 10, wherein said method for online authentication of ownership of a WiFi Access Point further comprising:

receiving a request for creating a digital listing from the user;

creating said digital listing and saving said digital listing in a database; and associating said digital listing with said WiFi Access Point and saving said association relationship in said database.

12. The non-transitory computer-readable storage medium of claim 10, wherein said method for online authentication of ownership of a WiFi Access Point further comprising:

receiving a request for updating a digital listing from the user;

updating said digital listing and saving said digital listing in a database; and associating said digital listing with said WiFi Access Point and saving said association relationship in said database.

13. A non-transitory computer-readable storage medium, having embodied thereon a program executable by a processor to perform a method for authenticating or verifying ownership of a digital listing associated with a WiFi Access Point, the method comprising:
providing a user at a wireless device an option to claim ownership of a digital listing that is associated with a WiFi Access Point;
receiving from the user at the wireless device a request for ownership of said digital listing;
using a method for online authentication of ownership of said WiFi Access Point to verify whether or not the user is the true owner of said WiFi Access Point; and
if the user is verified to be the true owner of said WiFi Access Point, approving said request and saving the user as verified owner of said digital listing in a database.

14. The non-transitory computer-readable storage medium of claim 13, wherein said method for online authentication of ownership of a WiFi Access Point comprising:
providing an option for the user to enter a first password;
receiving said first password entered by the user;
controlling a WiFi access module to connect to said WiFi Access Point using said first password;
after changing, by the user, the password of the WiFi Access Point to a second password, connecting said WiFi access module to said WiFi Access Point using said second password within a time limit from the successful verification that said first password is used to connect said WiFi access module to said WiFi Access Point, wherein said second password must be different from said first password; and
if said second password can be used to connect said WiFi access module to said WiFi Access Point, confirming the user is the true owner of said Wifi Access Point.

15. The non-transitory computer-readable storage medium of claim 13, wherein said method for online authentication of ownership of a WiFi Access Point comprising:
providing an option for the user to enter a first password;
receiving said first password entered by the user;
controlling a WiFi access module connect to said WiFi Access Point using said first password;
if said first password can be used to connect said WiFi access module to said WiFi Access Point, confirming the user is the true owner of said WiFi Access Point.

16. The non-transitory computer-readable storage medium of claim 13, wherein said method for online authentication of ownership of a WiFi Access Point comprising:
displaying a password to the user;
after the user changes the password of said WiFi Access Point to the displayed password, controlling a WiFi access module to connect to said WiFi Access Point using said password;
if said password can be used to connect said WiFi access module to said WiFi Access Point, confirming the user is the true owner of said WiFi Access Point.

17. The non-transitory computer-readable storage medium of claim 13, wherein said method for online authentication of ownership of a WiFi Access Point comprising:
checking if said selected WiFi Access Point is the same as the WiFi Access Point that the wireless device of said user is connected to; and
if said selected WiFi Access Point is the same as the WiFi Access Point that the wireless device of said user is connected to, confirming the user is the true owner of said WiFi Access Point.

18. A non-transitory computer-readable storage medium, having embodied thereon a program executable by a processor to perform a method for requesting ownership transfer of a digital listing associated with a WiFi Access Point from an existing owner to a user, the method comprising:
providing a user at a wireless device an option to claim as the new owner of a digital listing that is associated with said WiFi Access Point and has an existing owner;
receiving from the user at a wireless device a request for ownership of said digital listing;
using a method for online authentication of ownership of said WiFi Access Point to verify whether or not the user is the true owner of said WiFi Access Point; and
if the user is verified to be the true owner of said WiFi Access Point, sending or displaying said request for ownership to the current existing owner.

19. The non-transitory computer-readable storage medium of claim 18, wherein said method for online authentication of ownership of a WiFi Access Point comprising:
providing an option for the user to enter a first password;
receiving said first password entered by the user;
controlling a WiFi access module to connect to said WiFi Access Point using said first password;
after changing, by the user, the password of the WiFi Access Point to a second password, connecting said Wifi access module to said WiFi Access Point using said second password within a time limit from the successful verification that said first password is used to connect said Wifi access module to said WiFi Access Point, wherein said second password must be different from said first password; and
if said second password can be used to connect said WiFi access module to said WiFi Access Point, confirming the user is the true owner of said WiFi Access Point.

20. The non-transitory computer-readable storage medium of claim 18, wherein said method for online authentication of ownership of a WiFi Access Point comprising:
providing an option for the user to enter a first password;
receiving said first password entered by the user;
controlling a WiFi access module to connect to said WiFi Access Point using said first password;
if said first password can be used to connect said WiFi access module to said WiFi Access Point, confirming the user is the true owner of said WiFi Access Point.

21. The non-transitory computer-readable storage medium of claim 18, wherein said method for online authentication of ownership of a WiFi Access Point comprising:
displaying a password to the user;
after the user changes the password of said WiFi Access Point to the displayed password, controlling a WiFi access module to connect to said WiFi Access Point using said password;
if said password can be used to connect said WiFi access module to said WiFi Access Point, confirming the user is the true owner of said WiFi Access Point.

22. The non-transitory computer-readable storage medium of claim 18, wherein said method for online authentication of ownership of a WiFi Access Point comprising:
checking if said selected WiFi Access Point is the same as the WiFi Access Point that said wireless device of the user is connected to; and if said selected WiFi Access Point is same as the WiFi Access Point that said wireless device of the user is connected to, confirming the user is the true owner of said WiFi Access Point.

23. A non-transitory computer-readable storage medium, having embodied thereon a program executable by a processor to perform a method for an existing owner to process the request for ownership transfer of a digital listing associated with a WiFi Access Point sent from a user, the method comprising:
displaying to the existing owner options comprising a. Accept and b. Reject;
receiving from said existing owner the selection of one option;
if said existing owner selects option a. Accept, transferring the ownership of said digital listing to the user and saving the new ownership of said digital listing in a database;
if said existing owner selects option b. Reject, using a method for Online Authentication of Ownership of a WiFi Access Point to verify whether or not said existing owner is the true owner of said WiFi Access Point; and
if said existing owner is verified to be the true owner of said WiFi Access Point, rejecting the request for ownership from the user and keeping the existing ownership of said digital listing.

24. The non-transitory computer-readable storage medium of claim 23, further comprising:
if said existing owner does not select either option a. Accept or b. Reject within a time limit, removing said existing owner as the owner of said digital listing in said database.

25. The non-transitory computer-readable storage medium of claim 23, further comprising:
if said existing owner does not select either option a. Accept or b. Reject within a time limit, transferring the ownership of said digital listing to the user and saving the new ownership of said digital listing in said database.

26. The non-transitory computer-readable storage medium of claim 23, wherein said method for online authentication of ownership of a WiFi Access Point comprising:
providing an option for the existing owner to enter a first password;
receiving said first password entered by the existing owner;
controlling a WiFi access module to connect to said WiFi Access Point using said first password;
after changing, by the existing owner, the password of the WiFi Access Point to a second password, controlling said WiFi access module to connect to said WiFi Access Point using said second password within a time limit from the successful verification that said first password is used to connect said Wifi access module to said WiFi Access Point, wherein said second password must be different from said first password; and
if said second password can be used to connect said WiFi access module to said WiFi Access Point, confirming the existing owner is the true owner of said WiFi Access Point.

27. The non-transitory computer-readable storage medium of claim 23, wherein said method for online authentication of ownership of a WiFi Access Point comprising:
providing an option for the existing owner to enter a first password;
receiving said first password entered by the existing owner;
controlling a WiFi access module to connect to said WiFi Access Point using said first password;
if said first password can be used to connect said WiFi access module to said WiFi Access Point, confirming the existing owner is the true owner of said Wifi Access Point.

28. The non-transitory computer-readable storage medium of claim 23, wherein said method for online authentication of ownership of a WiFi Access Point comprising:
displaying a password to the existing owner;
after the user changes the password of said WiFi Access Point to the displayed password, controlling a WiFi access module to connect to said WiFi Access Point using said password;
if said password can be used to connect said WiFi access module to said WiFi Access Point, confirming the existing owner is the true owner of said WiFi Access Point.

29. The non-transitory computer-readable storage medium of claim 23, wherein said method for online authentication of ownership of a WiFi Access Point comprising:
checking if said selected WiFi Access Point is the same as the WiFi Access Point that the wireless device of the existing owner is connected to; and
if said selected WiFi Access Point is the same as the WiFi Access Point that the wireless device of the existing owner is connected to, confirming the existing owner is the true owner of said WiFi Access Point.

* * * * *